United States Patent

Chen et al.

[11] Patent Number: 5,873,283
[45] Date of Patent: Feb. 23, 1999

[54] MOTORIZED CONTROL FOR A DERAILLEUR

[76] Inventors: Cheng Hsiung Chen, 3F.,No. 7-2, Alley 1, Lane 174, Sec. 1, Nan Ya Hsi Rd., Pan Chiao City, Taipei Hsien; Chen Chin Chang, No. 12, Lane 18, Shou Te Street, Chung Ho City, Taipei Hsien, both of Taiwan

[21] Appl. No.: 804,343

[22] Filed: Feb. 21, 1997

[51] Int. Cl.[6] .............................. B62M 9/04; B62M 25/08
[52] U.S. Cl. .................. 74/473.12; 74/89.14; 74/473.14; 192/142 R; 318/467
[58] Field of Search .............................. 74/89.14, 473.12, 74/473.13, 473.14; 192/142 R, 142 A; 318/467

[56] References Cited

U.S. PATENT DOCUMENTS

| | | | |
|---|---|---|---|
| 3,732,787 | 5/1973 | Yamaguchi | 74/473.1 X |
| 4,065,983 | 1/1978 | Mimura | 74/335 |
| 5,514,041 | 5/1996 | Hsu | 474/78 |
| 5,599,244 | 2/1997 | Ethington | 474/70 |

*Primary Examiner*—Allan D. Herman
*Attorney, Agent, or Firm*—Bacon & Thomas, PLLC

[57] ABSTRACT

A motorized control for a derailleur for bicycles including a box accommodating a motor. The motor has a drive axle pivotally connected to a worm for actuating a transmission mechanism comprising a drive gear, a couple of driven gears engaging with the drive gear, and a control wheel. The bottom side of the control wheel is provided with two symmetrical posts round which a cable may be wound. Two microswitches are disposed at the outer periphery of the control wheel. When the posts of the control wheel touches the respective microswitches, the rotational angle of the control wheel may be controlled and the control wheel positioned. The box is mounted on the bicycle and electrical switches are installed at the handlebar. When the motor rotates in a clockwise or counter-clockwise direction, the cable may be controlled via the control wheel to become taut or relaxed to thereby control the speed of the bicycle.

2 Claims, 5 Drawing Sheets

MOTORIZED CONTROL FOR A DERAILLEUR

BACKGROUND OF THE INVENTION

(a) Field of the Invention

The present invention relates generally to a motorized control for a derailleur, and more particularly to a derailleur which may be operated by pressing switches on the handlebar to achieve change of speed of bicycles in an easy and safe way.

(b) Description of the Prior Art

In conventional bicycles with derailleur, as a general rule, a cable is provided to control the chain to wind round different gears to achieve change of speed. The cable is connected to a shifter at the handlebar. By moving the shifter, the cable may be pulled taut or released so as to control the chain to fit onto the gear of a different diameter. But since the cyclist has to grip the handlebar in order to keep balance, control of the shifter when riding may be difficult and dangerous.

SUMMARY OF THE INVENTION

According to a first aspect of the present invention, a motorized control for a derailleur for bicycles comprises a box accommodating a transmission mechanism including a motor, a worm, a drive gear, a couple of driven gears, and a control wheel. Two symmetrical posts are disposed on the bottom side of the control wheel at suitable positions for mounting a cable. The box is installed on the bicycle, and electrical switches are provided at the handlebar of the bicycle to cause the motor to rotate in a clockwise or counter-clockwise direction so that the control wheel relatively pull or release the cable. In this way, manual control of speed change may be achieved. Besides, it is easy to control change of speed during riding, preventing possible danger.

According to another aspect of the present invention, two microswitches are respectively disposed at the outer periphery of the control wheel so that when the posts on the control wheel respectively touch the microswitches, the rotational angle of the control wheel may be controlled. The positions of the posts on the control wheel may also be adjusted to adapt to different models of bicycles.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
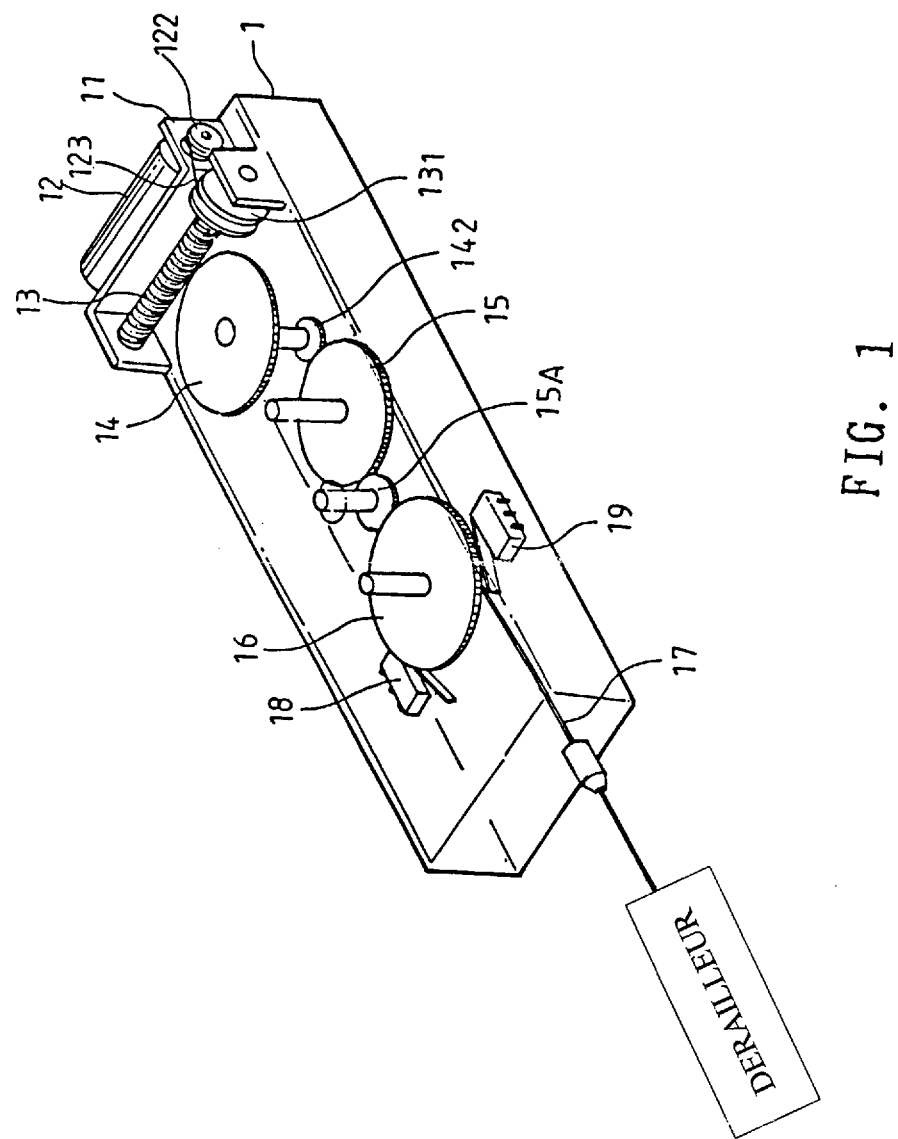
FIG. 1 is a schematic elevational view of the present invention.
Figure 2:
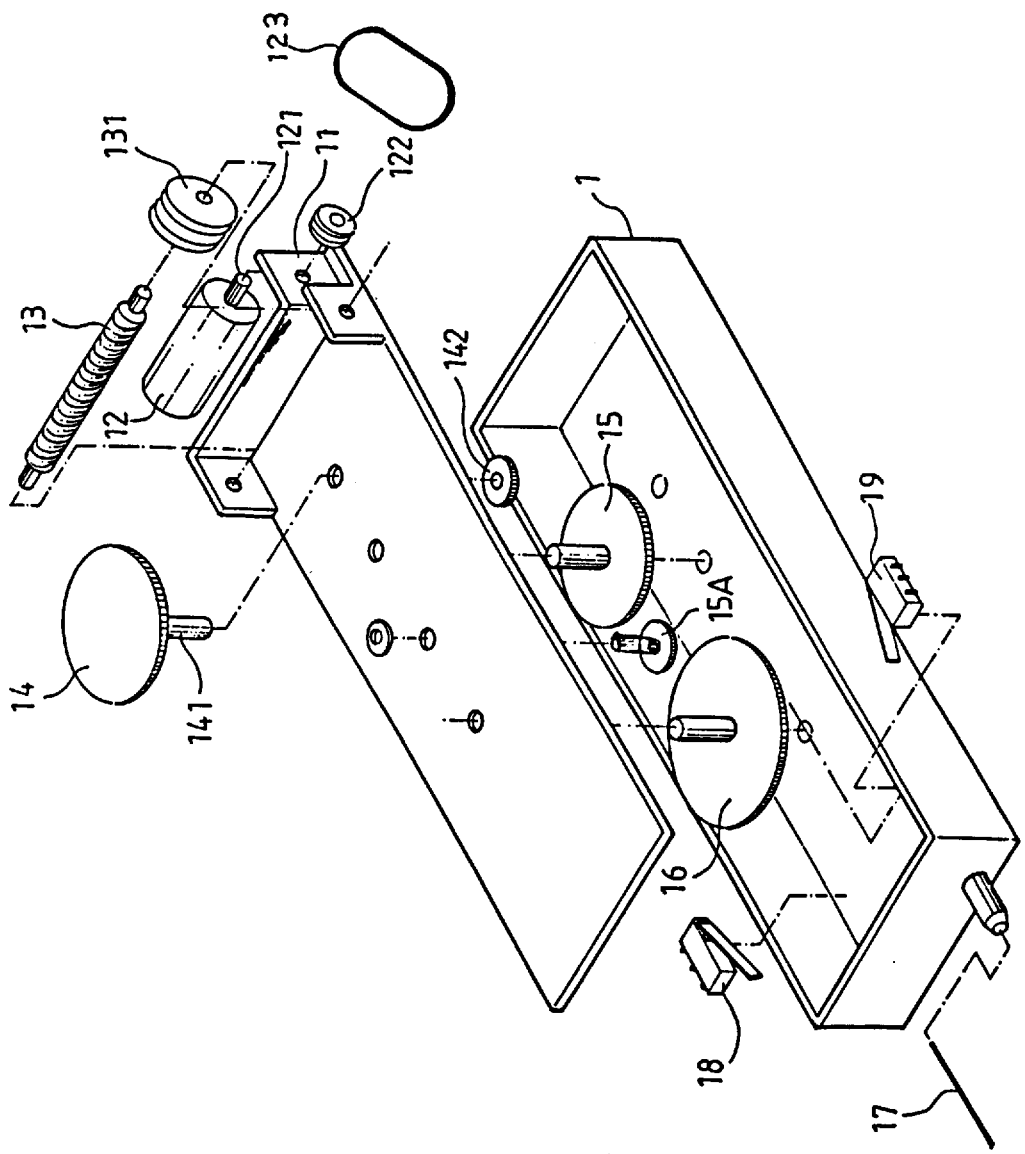
FIG. 2 is a schematic exploded view of the present invention.

With reference to FIGS. 1 and 2, the motorized control for a derailleur according to the present invention essentially comprises a box 1 with a motor mounting seat 11 at an upper side thereof mounting a motor 12. A drive axle 121 of the motor 12 is pivotally connected to a wheel 122. A belt 123 is fitted around the wheel 122 and a pulley 131 of a worm 13 at one side of the motor 12 so that when the motor 12 rotates, the belt 123 may transmit the power to drive the worm 13 to rotate.

The worm 13 engages a drive gear 14 having a spindle 141 a bottom end of which is pivotally connected to a pinion 142. The pinion 142 engages two driven gears 15, 15A. The drive gear 15 engages with a control wheel 16, and a cable 17 is fitted at the bottom of the control wheel 16. In this way, the speed of the motor 12 may, due to transmission via the drive gear 14, the driven gears 15, 15A and the control wheel 16, be reduced to increase the torque so that the control wheel 16 may work in cooperation with two microswitches 18 and 19 disposed at both sides to pull or release the cable 17, thus achieving change in speed.

Figure 3:
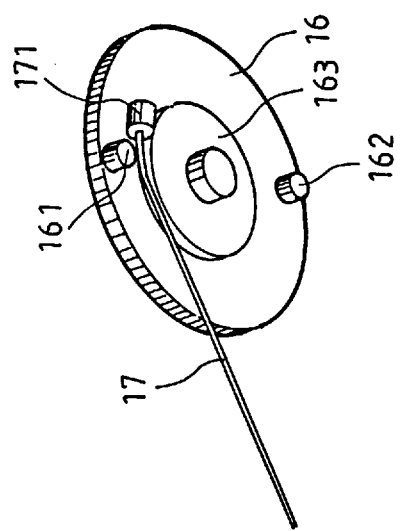
FIG. 3 is a schematic view of the control wheel of the present invention.

With reference to FIG. 3, as well as FIG. 2, the periphery of the bottom side of the control wheel 16 according to the present invention is provided with two symmetrical posts 161, 162 respectively disposed at a suitable position. The center of the bottom side of the control wheel 16 is a circular raised block 163, and a front end of the cable 17 is provided with a cylindrical block 171, which is disposed at a front end of the post 161. The cable 17 is then wound along the periphery of the raised block 163 so that when it controls the control wheel 16 to rotate in a clockwise or counter-clockwise direction, due to the block 171 of the cable 17 being brought to displace by the posts 161, 162, the cable 17 will be pulled taut or released to achieve change in speed. And when the control wheel 16 rotates in a clockwise or counter-clockwise direction, the posts 161, 162 will respectively touch the microswitches 18, 19 to connection electricity to stop the motor 12 so that the control wheel 16 is positioned, and the cable 17 is prevented from breaking or disengagement. Besides, the positions of the posts 161, 162 may be adjusted so as to change the rotational angle of the control wheel 16 to adapt to different models of bicycles.

Figure 4:
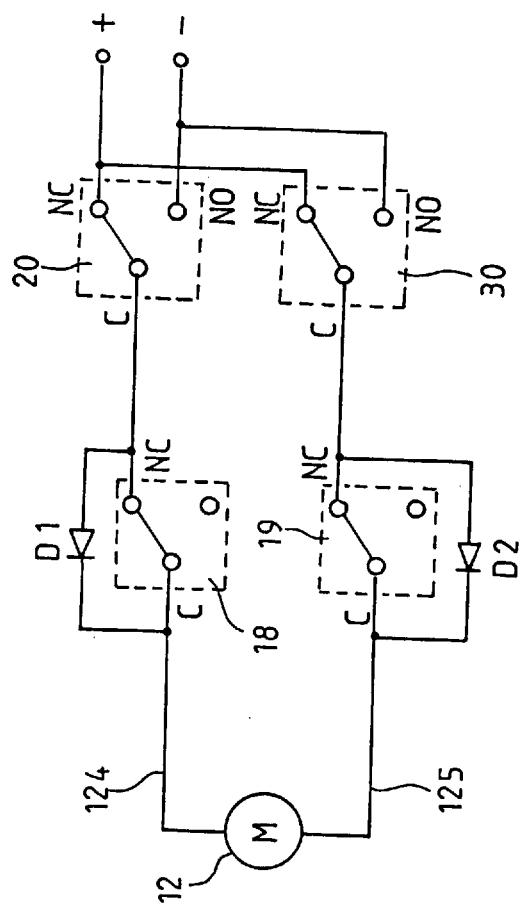
FIG. 4 illustrates the control circuit of the present invention.

With reference to FIG. 4, the positive and negative lead wires 124 and 125 of the motor 12 are respectively connected to a common contact C of the microswitches 18 and 19, whereas the NC's of the microswitches are respectively connected to a common contact C of two electrical switches 20, 30. The NC's and NO's of the switches 20 and 30 are connected and are then respectively connected to the positive and negative ends of a battery. In this way, when the switch 20 is pressed, negative electric currents will flow via its NO and C and the NC and C of the microswitch 18 to connect the lead wire 124 of the motor 12, whereas the positive electric currents will flow via the NC and C of the switch 30, and a diode D2 to connect the lead wire 125 of the motor 12. In this way, the motor 12 is caused to rotate in a clockwise direction. On the contrary, when the electrical switch 30 is pressed, the motor 12 will rotate in a counter-clockwise direction. Two diodes D1 and D2 are provided to, apart from making the electrical connection, prevent simultaneous pressing of the switches 20 and 30, which may cause short circuit.

Figure 5:
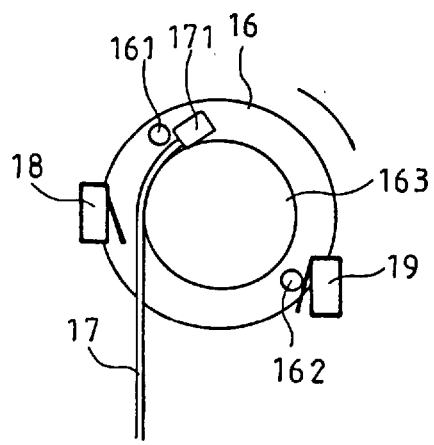
FIG. 5 is a schematic view illustrating action of the present invention.
Figure 5:
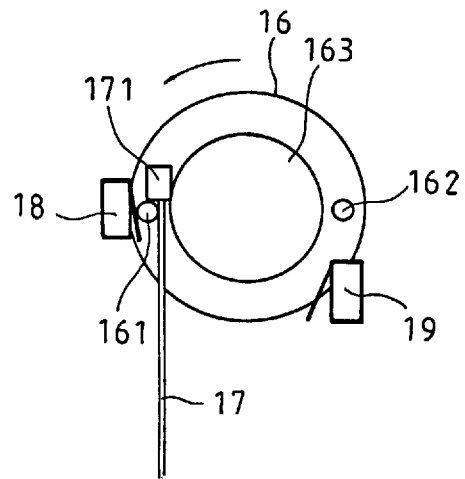

As shown in FIG. 5, when the motor 12 rotates, the control wheel 16 will relatively rotate in a clockwise or counter-clockwise direction so that when it rotates in a clockwise direction, the cable 17 will be pulled taut, and when it rotates in a counter-clockwise direction, the cable 17 will become released, thus achieving control of speed of the bicycle. Certainly, when the control 16 rotates, the posts 161 and 162 will respectively touch the microswitches 18 and 19 to stop the motor 12 so that the control wheel 16 may be positioned and the cable 17 may be prevented from breaking or disengagement.

In summary, the present invention utilizes an electric transmission mechanism to control the cable of the bicycle so as to achieve manual control of the speed of the bicycle, thus improving the drawbacks with the prior art and enhance the safety of riding bicycles.

Although the present invention has been illustrated and described with reference to the preferred embodiment thereof, it should be understood that it is in no way limited to the details of such embodiment but is capable of numerous modifications within the scope of the appended claims.

What is claimed is:

1. A motorized derailleur control for bicycles, comprising a motor, a drive axle of said motor being non-rotatably connected to a wheel, a belt being provided to fit around said wheel and a pulley of a worm disposed at one side of said motor, said worm engaging a drive gear, a bottom end of a spindle of said drive gear being non-rotatably connected to a pinion, said pinion being disposed so that it engages two driven gears, which in turn engage a control wheel, wherein said control wheel has a circular raised block in the center of a bottom side thereof with a couple of posts respectively disposed at a periphery of said raised block at suitable positions such that a cable having a cylindrical block at a front end thereof, said cylindrical block being insertably disposed between one of said posts and said raised block to allow clockwise or counter-clockwise rotation of said control wheel when said control wheel is actuated by said motor, thereby enabling said cable to be pulled taut or released to achieve change of speed.

2. A motorized derailleur control for bicycles as claimed in claim 1, wherein two microswitches are respectively disposed about the outer periphery of said control wheel such that when said control wheel rotates in a clockwise or counter-clockwise direction, one of said posts is arranged to touch the corresponding microswitch to position the rotation of said wheel.

* * * * *